US008480185B2

(12) United States Patent
Itoh

(10) Patent No.: US 8,480,185 B2
(45) Date of Patent: Jul. 9, 2013

(54) BRAKE CONTROL APPARATUS

(75) Inventor: Akihiro Itoh, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 1735 days.

(21) Appl. No.: 11/621,842

(22) Filed: Jan. 10, 2007

(65) Prior Publication Data
US 2007/0164607 A1   Jul. 19, 2007

(30) Foreign Application Priority Data

Jan. 19, 2006 (JP) ................. 2006-011768
Jan. 10, 2007 (JP) ................. 2007-002177

(51) Int. Cl.
*B60T 8/32* (2006.01)
(52) U.S. Cl.
USPC ........................................ 303/192
(58) Field of Classification Search
USPC .................................. 303/191, 192
See application file for complete search history.

(56) References Cited

U.S. PATENT DOCUMENTS

| | | | | |
|---|---|---|---|---|
| 5,667,282 A * | 9/1997 | Kim | ................... | 303/3 |
| 6,120,110 A * | 9/2000 | Shimizu | ................ | 303/191 |
| 6,193,332 B1 * | 2/2001 | Ono | ............... | 303/191 |
| 6,332,654 B1 * | 12/2001 | Yano | .............. | 303/89 |
| 6,370,466 B1 | 4/2002 | Hada et al. | | |
| 6,382,741 B1 * | 5/2002 | McCann et al. | ............. | 303/191 |
| 7,000,998 B2 * | 2/2006 | Hano et al. | ................. | 303/191 |
| 2002/0033642 A1 * | 3/2002 | Holl | ................ | 303/191 |
| 2006/0186731 A1 * | 8/2006 | Bach | ............. | 303/191 |
| 2007/0096557 A1 * | 5/2007 | Tamai et al. | ................. | 303/191 |

FOREIGN PATENT DOCUMENTS

| | | |
|---|---|---|
| JP | 10-029511 | 2/1998 |
| JP | H11-165620 | 6/1999 |
| JP | 2000-033859 | 2/2000 |
| JP | 2000-062588 | 2/2000 |
| JP | 2000-127927 | 5/2000 |
| JP | 2003-291693 | 10/2003 |

OTHER PUBLICATIONS

An English translation of the Japanese Office Action of corresponding Japanese Application No. JP 2007-002177, dated Jan. 10, 2012, mailed Jan. 17, 2012.

* cited by examiner

*Primary Examiner* — Thomas J Williams
(74) *Attorney, Agent, or Firm* — Global IP Counselors, LLP

(57) ABSTRACT

A brake control apparatus is configured to suppress sounds while a vehicle is stationary. The brake control apparatus basically has a brake operation detecting section, a vehicle state detecting section, a braking force generating section, a braking force adjusting section and a brake control section. The brake operation detecting section detects a brake operation value indicative of an operation of a brake element. The vehicle state detecting section detects whether a vehicle is in a stopped state. The braking force generating section generates a braking force. The braking force adjusting section adjusts the braking force generated in the braking force generating section based on the brake operation value. The brake control section then control the braking force to prohibit reduction in the braking force when the brake operation value decreases while the vehicle is in the stopped state.

12 Claims, 7 Drawing Sheets

BRAKE CONTROL APPARATUS

CROSS-REFERENCE TO RELATED APPLICATIONS

This application claims priority to Japanese Patent Application No. 2006-011768, filed on Jan. 19, 2006. The entire disclosure of Japanese Patent Application No. 2006-011768 is hereby incorporated herein by reference.

BACKGROUND OF THE INVENTION

1. Field of the Invention

The present invention relates to a brake control apparatus configured and arranged to use energy from an energy source to generate braking force in response to a brake pedal being depressed and also configured and arranged to be able to control the braking force independently of depression of the brake pedal.

2. Background Information

Japanese Laid-Open Patent Application Publication No. 11-165620 discloses a conventional so-called brake-by-wire type braking apparatus in which a sensor detects an operation or control input of a brake pedal, and braking force is generated based on the detected value of the control input. The conventional braking apparatus operates an electric motor according to depression of the brake pedal when a driver operates the brake pedal, and controls the braking force corresponding to the depression of the brake pedal.

In view of the above, it will be apparent to those skilled in the art from this disclosure that there exists a need for an improved brake control apparatus. This invention addresses this need in the art as well as other needs, which will become apparent to those skilled in the art from this disclosure.

SUMMARY OF THE INVENTION

In the conventional brake control apparatus as mentioned above, change in the drive sound of the electric motor unnecessarily occurs even when the vehicle remains stationary when the electric motor is operated in accordance with the operation of the brake pedal by the driver.

Thus, one object of the present invention is to provide a brake control apparatus in which a braking force is maintained when a brake operation value of a brake element is reduced while the vehicle remains stationary.

In order to achieve the above mentioned object and other objects of the present invention, a brake control apparatus is provided that basically comprises a brake operation detecting section, a vehicle state detecting section, a braking force generating section, a braking force adjusting section and a brake control section. The brake operation detecting section is configured to detect a brake operation value indicative of an operation of a brake element. The vehicle state detecting section is configured to detect whether a vehicle is in a stopped state. The braking force generating section is configured to generate a braking force. The braking force adjusting section is configured to adjust the braking force generated in the braking force generating section based on the brake operation value. The brake control section is configured to control the braking force adjusting section to prohibit reduction in the braking force when the brake operation value decreases while the vehicle is in the stopped state.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
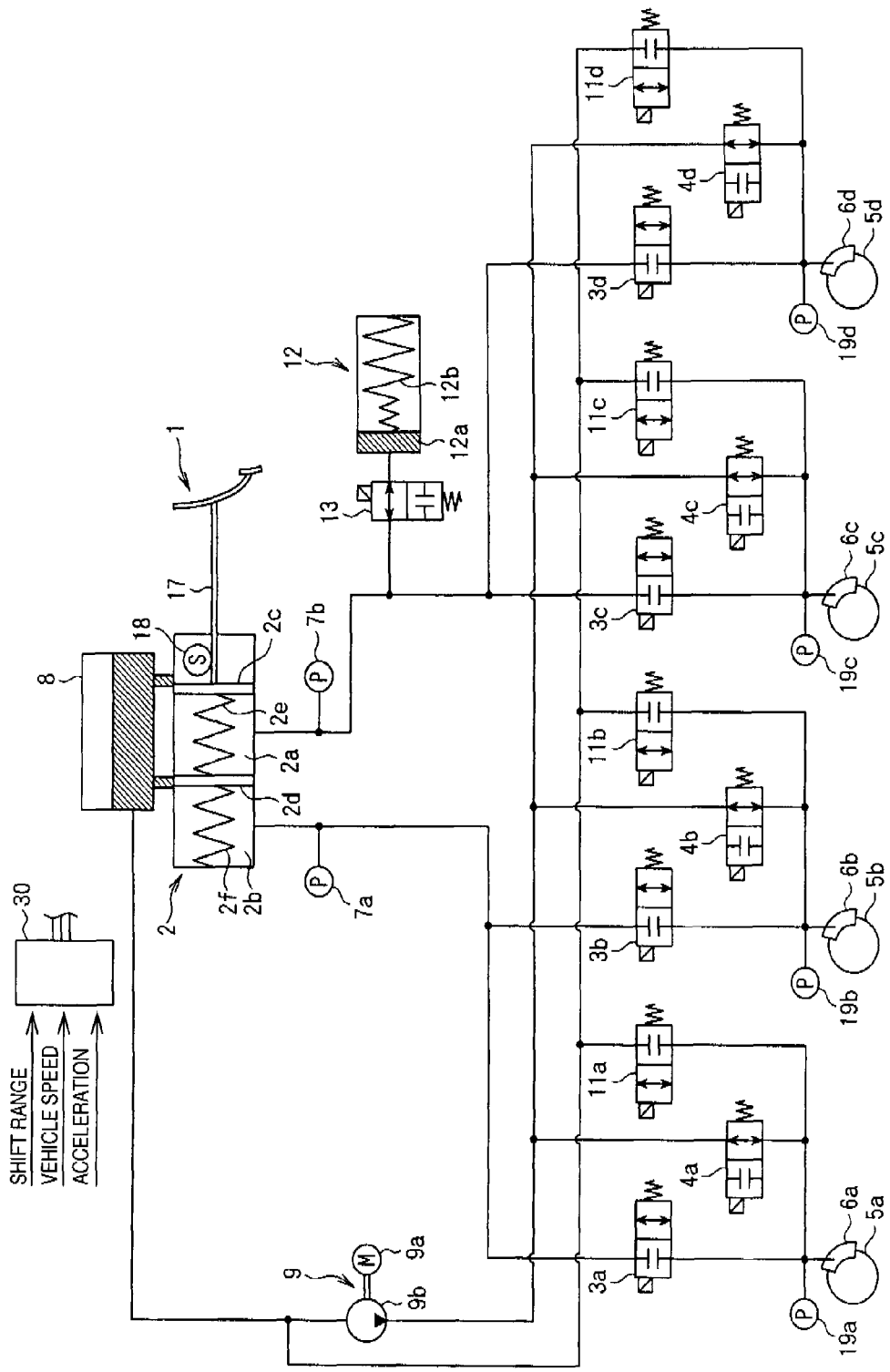
FIG. 1 is an overall schematic diagram of a brake control apparatus in accordance with a preferred embodiment of the present invention.

Referring initially to FIG. 1, a brake control apparatus is illustrated in accordance with a preferred embodiment of the present invention. FIG. 1 is an overall schematic diagram of the brake control apparatus according to the illustrated embodiment of the present invention. As seen in FIG. 1, the brake control apparatus includes a brake pedal 1 (brake element), a master cylinder 2, a plurality of shutoff valves 3a to 3d, a plurality of normally open electromagnetic valves 4a to 4d (control valves), a plurality of vehicle wheels 5a to 5d, a plurality of wheel cylinders 6a to 6d, a pair of master cylinder pressure sensors 7a and 7b, a hydraulic fluid reservoir 8, an actuator unit 9, a plurality of normally closed electromagnetic valves 11a to 11d, a stroke simulator 12, a stroke simulator cut valve 13, an input rod 17, a stroke sensor 18, a plurality of wheel cylinder pressure sensors 19a to 19d, and a control unit 30 (brake control section). At least the wheel cylinders 6a to 6d preferably constitute a braking force generating section of the present invention.

The master cylinder 2 is configured and arranged to be pressurized according to the amount by which the brake pedal 1 is depressed through the input rod 17 as shown in FIG. 1. The master cylinder 2 has two output channels, and working fluid pressure is outputted to these two output channels. One output channel is hereinafter referred to as a primary-side channel, while the other output channel is referred to as a secondary-side channel. The working fluid pressure of the secondary-side channel is applied via the shutoff valves 3a and 3b (open during standby) to the wheel cylinders 6a and 6b for generating braking force in the vehicle wheels 5a and 5b, respectively, while the working fluid pressure of the primary-side channel is applied via the shutoff valves 3c and 3d (open during standby) to the wheel cylinders 6c and 6d for generating braking force in the vehicle wheels 5c and 5d, respectively.

The master cylinder pressure sensors 7a and 7b are preferably pressure sensors that are configured and arranged to sense the working fluid pressures (master cylinder pressures Pm) in the secondary-side channel and the primary-side channel, respectively. More specifically, the master cylinder pressure sensors 7a and 7b are installed at each of the secondary-side and primary-side channels of the master cylinder 2. The master cylinder 2 has a pair of pressure generating chambers 2a and 2b. The pressure generating chambers 2a and 2b include a primary piston 2c and a secondary piston 2d, respectively, inside the master cylinder 2. As shown in FIG. 1, a spring 2e is placed inside the pressure generating chamber 2a, and a spring 2f is placed inside the pressure generating chamber 2b.

When the brake pedal 1 is depressed, the depression force causes the input rod 17 to move forward (toward left side in FIG. 1), the primary piston 2c to be pressed, the fluid in the pressure generating chamber 2a to be compressed, and the secondary piston 2d to be moved. The working fluid (master cylinder pressure Pm) is then outputted from the pressure generating chambers 2a and 2b to the primary-side channel and the secondary-side channel, respectively. Thus, the output channel from the pressure generating chamber 2a is equivalent to the primary-side channel, and the output channel from the pressure generating chamber 2b is equivalent to the secondary-side channel.

The actuator unit 9 (the braking force adjusting section and the fluid pressure adjusting section) is connected to the reservoir 8 mounted on the master cylinder 2. The actuator unit 9 preferably includes an electric motor 9a and a hydraulic actuator 9b that is rotatably driven by the electric motor 9a. The electric motor 9a is controlled by the control unit 30 (brake control section), which will be described in more detail later. The actuator unit 9 and the wheel cylinders 6a to 6d are connected via the normally open electromagnetic valves 4a to 4d (open during standby). The normally open electromagnetic valves 4a to 4d are configured and arranged to control the supply of braking pressure outputted from the actuator unit 9 to the wheel cylinders 6a to 6d. In this illustrated embodiment, the actuator unit 9 preferably constitutes a braking actuator.

Furthermore, the wheel cylinders 6a to 6d and the reservoir 8 are connected via the normally closed electromagnetic valves 11a to 11d (closed during standby). The normally closed electromagnetic valves 11a to 11d are configured and arranged to control the discharge of fluid pressure from the wheel cylinders 6a to 6d into the reservoir 8.

The stroke simulator 12 is connected upstream of the shutoff valves 3c and 3d on the primary-side of the master cylinder 2 via the stroke simulator cut valve 13. The stroke simulator cut valve 13 is a normally closed electromagnetic on-off valve (closed during standby). Normally, and also during startup of the brake control apparatus (brake-by-wire system), the shutoff valves 3a to 3d are closed to shut the master cylinder 2 off from the wheel cylinders 6a to 6d and the stroke simulator cut valve 13 remains electrically energized and opened so that the primary-side channel of the master cylinder 2 is connected with the stroke simulator 12. The stroke simulator 12 is configured and arranged to absorb the working fluid pressure outputted from the master cylinder 2 in accordance with the depression of the brake pedal 1 when the stroke simulator cut valve 13 is open.

As shown in FIG. 1, the stroke simulator 12 includes a cylinder, a piston 12a slidably disposed inside the cylinder, and a coil spring 12b configured and arranged to urge the piston 12a. The stroke simulator 12 is configured and arranged to generate a pedal reaction force according to the stroke of the brake pedal 1.

The stroke sensor 18 is configured and arranged to detect a brake operation value of the brake pedal 1. More specifically, in the illustrated embodiment of the present invention, the stroke sensor 18 is configured and arranged to detect an operation amount by which the brake pedal 1 is depressed (stroke Sp) or an operation force by which the brake pedal 1 is depressed (master cylinder pressure Pm) as the brake operation value of the brake pedal 1. The wheel cylinder pressure sensors 19a to 19d are configured and arranged to detect the working fluid pressures of the wheel cylinders 6a to 6d.

The shutoff valves 3a to 3d, the normally open electromagnetic valves 4a to 4d, the normally closed electromagnetic valves 11a to 11d, and the stroke simulator cut valve 13 are operatively coupled to the control unit 30 so that these valves are selectively opened and closed in accordance with control signals from the control unit 30 supplied to a solenoid of each of these valves. These valves remain in standby mode (closed in cases of the normally closed electromagnetic valves 11a to 11d and the stroke simulator cut valve 13, or open in cases of the shutoff valves 3a to 3d and the normally open electromagnetic valves 4a to 4d) when the control signals indicate an "off" state (electrically non-conducting state), and the valves are switched to their offset positions (open in cases of the normally closed electromagnetic valves 11a to 11d and the stroke simulator cut valve 13, or closed in cases of the shutoff valves 3a to 3d and the normally open electromagnetic valves 4a to 4d) when the control signals indicate an "on" state (electrically conducting). The result of this configuration is multiple brake control systems (four in this illustrated embodiment of the present invention) that are capable of supplying fluid pressure from the master cylinder 2 to the wheel cylinders 6a to 6d.

The control unit 30 preferably includes a microcomputer with a brake control program that controls the brake control apparatus as discussed below. The control unit 30 can also include other conventional components such as an input interface circuit, an output interface circuit, and storage devices such as a ROM (Read Only Memory device) device and a RAM (Random Access Memory device) device. The microcomputer of the control unit 30 is programmed to control the shutoff valves 3a to 3d, the normally open electromagnetic valves 4a to 4d, the actuator unit 9, the normally closed electromagnetic valves 11a to 11d, and the stroke simulator cut valve 13 and other components of the brake control apparatus. The memory device circuit stores processing results and control programs such as ones for the brake control operations that are used by the processor circuit. The control unit 30 is operatively coupled to the various components of the brake control apparatus in a conventional manner. The internal RAM of the control unit 30 stores statuses of operational flags and various control data. The control unit 30 is capable of selectively controlling any of the components of the control system in accordance with the control program. It will be apparent to those skilled in the art from this disclosure that the precise structure and algorithms for the control unit 30 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

During normal operations, the control unit 30 is configured to control the opening and closing of the shutoff valves 3a to 3d, the normally open electromagnetic valves 4a to 4d, the normally closed electromagnetic valves 11a to 11d, and the stroke simulator cut valve 13. In other words, the shutoff valves 3a to 3d between the master cylinder 2 and the wheel cylinders 6a to 6d are kept closed, whereby the master cylinder 2 is closed off from the wheel cylinders 6a to 6d during the normal operations. The stroke Sp of the brake pedal 1 or the master cylinder pressure Pm is determined by the stroke sensor 18. The master cylinder pressure Pm can also be determined by the master cylinder pressure sensors 7a and 7b. Then, the control unit 30 is configured to calculate a target deceleration rate Gt according to the stroke Sp and/or the master cylinder pressure Pm. The fluid pressure (brake fluid pressure) to be applied to the wheel cylinders 6a to 6d is generated by driving the actuator unit 9 based on the calculated target deceleration rate Gt, and the control unit 30 is configured to control the normally open electromagnetic valves 4a to 4d and the normally closed electromagnetic valves 11a to 11d. Furthermore, the stroke simulator cut valve 13 is open at this time, and the depression of the brake pedal 1 is absorbed by the stroke simulator 12.

Figure 2:
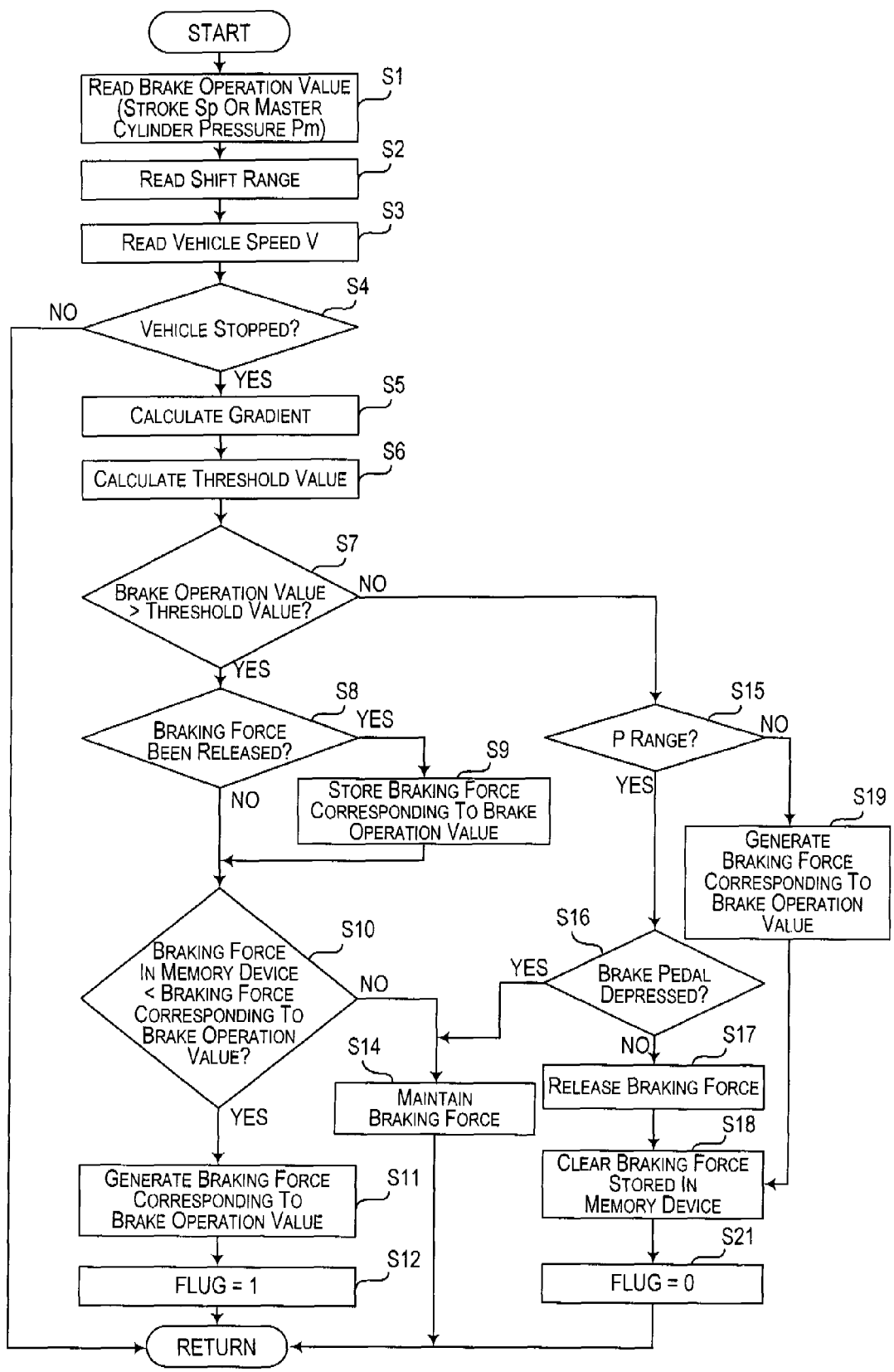
FIG. 2 is a flowchart of a brake control process executed in a control unit of the brake control apparatus in accordance with the illustrated embodiment of the present invention.

Referring now to FIG. 2, a brake control process executed by the control unit 30 will be explained in more detail. The control unit 30 is configured to perform the brake control process illustrated in the flowchart of FIG. 2 while the vehicle remains stationary.

First, in step S1 of FIG. 2, the control unit 30 is configured to detect a brake operation value indicative of the depression of the brake pedal 1. More specifically, the control unit 30 is configured to read at least one of the stroke Sp of the brake pedal 1 and the master cylinder pressure Pm as the brake operation value of the brake pedal 1. The master cylinder pressure Pm can be based on the output signal from the stroke sensor 18 and/or the master cylinder pressure sensors 7a and 7b for determining the brake operation value of the brake pedal 1.

Then, in step S2, the control unit 30 is configured to read the current shift range. More specifically, the control unit 30 is configured to read the shift range based on, for example, a sensor mounted in the vehicle, which is configured and arranged to detect the shift range.

Next, in step S3, the control unit 30 is configured to read the vehicle speed V. More specifically, the control unit 30 is configured to read the vehicle speed V based on, for example, a wheel speed sensor mounted in the vehicle, which is configured and arranged to detect the wheel speed.

In step S4, the control unit 30 is configured to determine whether the vehicle is stopped (i.e., whether the vehicle is in a stopped state). The control unit 30 is configured to determine whether the vehicle is in the stopped state based on the vehicle speed V detected in step S3. More specifically, the control unit 30 is configured to determine that the vehicle is in the stopped state when the vehicle speed V is 0 (V=0). In such case, the control unit 30 is configured to proceed to step S5. On the other hand, the control unit 30 is configured to determine that the vehicle is in motion (i.e., the vehicle is not in the stopped state) when the vehicle speed V is not 0 (V≠0). In such case, the control unit 30 is configured to end this cycle of the control processing illustrated in FIG. 2, and the control process is initiated once again from step S1 (the same applies hereinafter).

In step S5, the control unit 30 is configured to calculate a gradient of an inclined road surface to determine a torque applied to the wheels while the vehicle remains stationary on an inclined road. For example, a map or the like including the gradients of the road surfaces designed based on experiments and calculations may be stored in advance in a storage device (not shown) of the vehicle, and the control unit 30 can read the gradient of the inclined road surface from the stored map. Alternatively, the control unit 30 can calculate the gradient of the road surface based on an output value from an acceleration sensor mounted in the vehicle, which is configured and arranged to detect the acceleration at a front portion and a rear portion of the vehicle. Although an acceleration sensor is described herein as an example for a sensor for calculating the gradient of the inclined road surface, the present invention is not limited to this arrangement. For example, another sensor such as a stroke sensor may be provided in a suspension of the vehicle to calculate the gradient of the inclined road surface based on the stroke of the suspension.

Next, in step S6, the control unit 30 is configured to calculate a threshold value for the brake operation value (the stroke Sp or the master cylinder pressure Pm) required to maintain the vehicle in the stopped state. In other words, in step S6, the control unit 30 is configured to calculate at least one of a threshold value Spth for the stroke Sp of the brake pedal 1 and a threshold value Pmth for the master cylinder pressure Pm. More specifically, the control unit 30 is configured to set an absolute minimum value of the stroke Sp or the master cylinder pressure Pm required to keep the vehicle stationary (i.e., an operation amount or an operation force required to maintain the vehicle in the stopped state) as the threshold value Spth or the threshold value Pmth. The absolute minimum value of the stroke Sp or the master cylinder pressure Pm is calculated as follows.

In cases in which, for example, a forward torque for advancing the vehicle forward is applied while the vehicle remains stationary, the stroke Sp or the master cylinder pressure Pm generated by a braking torque that balances out this forward torque is set to the threshold value Spth or the threshold value Pmth. In cases in which the vehicle stops on an inclined road, and reverse torque for reversing the vehicle backward is thereby applied, the reverse torque applied to the vehicle is also taken into account when the threshold value Spth or the threshold value Pmth is set. Specifically, as the difference between the reverse torque applied to the vehicle by the stopping of the vehicle on an inclined road, and the forward torque applied to the vehicle from a drive source (an engine or electric motor) mounted in the vehicle increases in the direction of movement of the vehicle, the absolute minimum value of the stroke Sp or the master cylinder pressure Pm required to keep the vehicle stationary also increases. Thus, this absolute minimum value of the stroke Sp or the master cylinder pressure Pm is set as the threshold value Spth or the threshold value Pmth.

Next, in step S7, the control unit 30 is configured to determine whether the stroke Sp or the master cylinder pressure Pm that is read in step S1 is greater than the threshold value Spth or the threshold value Pmth calculated in step S6. When the control unit 30 determines that the stroke Sp or the master cylinder pressure Pm is greater than the threshold value Spth or the threshold value Pmth, then the control unit 30 proceeds to step S8. On the other hand, when the control unit 30 determines that the stroke Sp or the master cylinder pressure Pm is equal to or less than the threshold value Spth or the threshold value Pmth, then the control unit 30 proceeds to S15.

In step S8, the control unit 30 is configured to determine whether a value of a flag FLUG is 0 (i.e., whether or not the braking force has been released). If the value of the flag FLUG is 0 (i.e., when the braking force has been released), then the process advances to step S9. On the other hand, if the value of the flag FLUG is not 0 (i.e., when the braking force has not been released), then the process advances to S10.

In step S9, the control unit 30 is configured to store the braking force corresponding to the stroke Sp or the master cylinder pressure Pm detected in step S1. More specifically, in step S9, the control unit 30 is configured to store the stroke Sp or the master cylinder pressure Pm detected in step S1 as a maximum stroke Spmax(n) or a maximum master cylinder pressure Pmmax(n) in the memory device. Then, the process advances to step S10.

In step S10, the control unit 30 is configured to determine whether the braking force stored in the memory device is less than the braking force corresponding to the brake operation value (the stroke Sp or the master cylinder pressure Pm) detected in step S1. More specifically, in step S10, the control unit 30 is configured to compare the maximum stroke Spmax(n) or the maximum master cylinder pressure Pmmax(n) stored in the memory device with the magnitude of the stroke Sp or the master cylinder pressure Pm detected in step S1. When the maximum stroke Spmax(n) or the maximum master cylinder pressure Pmmax(n) stored in the memory device is equal to or greater than the stroke Sp or the master cylinder pressure Pm detected in step S1, then the process advances to step S14. When the maximum stroke Spmax(n) or the maximum master cylinder pressure Pmmax(n) in the memory device is less than the stroke Sp or the master cylinder pressure Pm detected in step S1, then the process advances to step S11.

In step S11 the control unit 30 is configured to update the braking force and to generate the braking force that corresponds to the brake operation value detected in step S1 (i.e., the braking force corresponding to the stroke Sp or the master cylinder pressure Pm detected in step S1). More specifically, in step S11, the control unit 30 is configured to set the stroke Sp or the master cylinder pressure Pm detected in step S1 as the maximum stroke Spmax(n) or the maximum master cylinder pressure Pmmax(n) in the memory device, and to generate the braking force corresponding to the maximum stroke Spmax(n) or the maximum master cylinder pressure Pmmax(n). Specifically, in the illustrated embodiment, the control unit 30 is configured to drive the actuator unit 9 to generate the brake fluid pressure (wheel cylinder pressure) to be supplied to the wheel cylinders 6a to 6d based on the maximum stroke Spmax(n) or the maximum master cylinder pressure Pmmax(n), and to control the normally open electromagnetic valves 4a to 4d and the normally closed electromagnetic valves 11a to 11d.

In step S12, the control unit 30 is configured to set the value of the flag FLUG to 1. Then, the control unit 30 is configured to end this cycle of the control process illustrated in FIG. 2.

When the control unit 30 determines in step S10 that the braking force stored in the memory device is equal to or greater than the braking force corresponding to the stroke Sp or the master cylinder pressure Pm detected in step S1, then the control unit 30 proceeds to step S14. In step S14, the control unit 30 is configured to maintain the braking force currently applied to the vehicle. More specifically, in step S14, the control unit 30 is configured to maintain the previous value of the maximum stroke Spmax(n-1) or the previous value of the maximum master cylinder pressure Pmmax(n-1) as the maximum stroke Spmax(n) or the maximum master cylinder pressure Pmmax(n), and to generate the braking force that corresponds to the maximum stroke Spmax(n) or the maximum master cylinder pressure Pmmax(n) to maintain the braking force currently applied to the vehicle. Then, the control unit 30 is configured to end this cycle of the control process illustrated in FIG. 2.

When the control unit 30 determines in step S7 that the stroke Sp or the master cylinder pressure Pm detected in step S1 is equal to or less than the threshold value Spth or the threshold value Pmth (No in step S7), then the control unit 30 proceeds to step S15. In step S15, the control unit 30 is configured to determine whether the shift range read in step S2 is within a P range (parking range) (i.e., determine whether the vehicle is in a parking state). In other words, in step S15, the control unit 30 is configured to determine whether the vehicle is in a state in which the vehicle can be kept stationary without depressing the brake pedal 1. When the control unit 30 determines that the shift range is within the P range, then the process advances to step S16. On the other hand, when the control unit 30 determines that the shift range is not within the P range, then the process advances to step S19.

In step S16, the control unit 30 is configured to determine whether the brake pedal 1 is depressed. In other words, in step S16, the control unit 30 is configured to determine whether the value of the stroke Sp or the master cylinder pressure Pm determined in step S1 is 0. When the value of the stroke Sp or the master cylinder pressure Pm is not 0 (i.e., when the driver is depressing the brake pedal 1), then the process advances to step S14. On the other hand, when the value of the stroke Sp or the master cylinder pressure Pm is 0 (i.e., when the driver is not depressing the brake pedal 1), then the process advances to step S17.

In step S17, the control unit 30 is configured to set a value of the braking force to 0 to release the braking force. More specifically, the control unit 30 is configured to release the braking force by stopping the operation of the actuator unit 9, releasing the brake fluid pressure (wheel cylinder pressure) supplied to the wheel cylinders 6a to 6d by opening the normally closed electromagnetic valves 11a to 11d.

Figure 6:
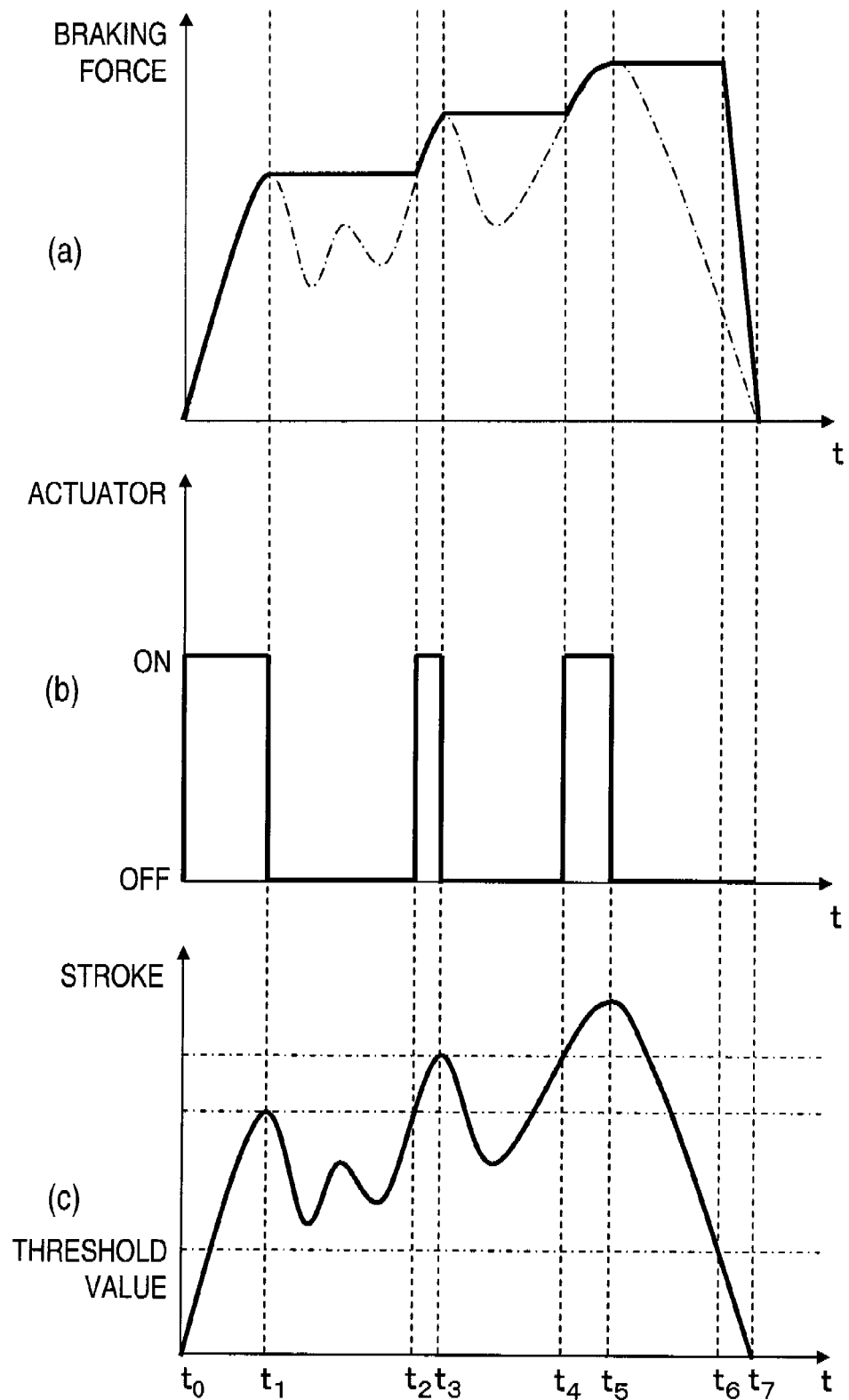
FIG. 6 is a characteristic diagram illustrating changes over time in the brake operation value (the stroke of the brake pedal), the output value of the actuator and the braking force when the brake pedal is pumped when the shift range is not within the parking range showing an alternative control of the braking force when the brake operation value is equal to or less than a threshold value while the vehicle remains stationary.

When the shift range is not within the P rage in step S15, then the process advances to step S19. In step S19, the control unit 30 is configured to generate the braking force corresponding to the brake operation value detected in step S1 (the stroke Sp or the master cylinder pressure Pm detected in step S1). Alternatively, in step S19, the control unit 30 may be configured to gradually decrease the braking force as shown in FIG. 6 as the stroke Sp or the master cylinder pressure Pm decreases. The process then advances to step S18.

In step S18, the control unit 30 is configured to clear the braking force stored in the memory device by inputting a value 0 as the maximum stroke Spmax(n) or the maximum master cylinder pressure Pmmax(n). Then, the process advances to step S21.

In step S21, the control unit 30 is configured to set the value of the flag FLUG to 0. Then, the control unit 30 is configured to end this cycle of the control process illustrated in FIG. 2.

The control processing executed in step S1 preferably constitutes a brake operation detecting section of the present invention. The control processing executed in step S4 and S15 preferably constitutes a vehicle state detecting section of the present invention.

Accordingly, with the brake control apparatus of the illustrated embodiment, when the control unit 30 determines that the vehicle is stopped (Yes in step S4), the control unit 30 is configured to calculate the gradient of the road (step S5) and the threshold value Spth or the threshold value Pmth (step S6). The threshold value Spth or the threshold value Pmth is the lower limit of the stroke Sp or the master cylinder pressure Pm required for the vehicle to maintain the stopped state even in cases in which the vehicle stops on an incline road.

Next, the control unit 30 is configured to determine whether the braking force has been released without depressing the brake pedal 1 (step S8) when the control unit 30 determines that the stroke Sp or the master cylinder pressure Pm is greater than the threshold value Spth or the threshold value Pmth (Yes in step S7).

When the control unit 30 determines that the brake pedal 1 has been depressed and the braking force has not been released (No in step S8), then the control unit 30 is configured to compare the maximum stroke Spmax(n) or the maximum master cylinder pressure Pmmax(n) stored in the memory device with the stroke Sp or the master cylinder pressure Pm detected in step S1 (step S10). The braking force is increased to a value corresponding to the stroke Sp or the master cylinder pressure Pm detected in step S1 (step S11) when the value of the stroke Sp or the master cylinder pressure Pm is greater than the value of the maximum stroke Spmax(n) or the maximum master cylinder pressure Pmmax(n) (i.e., when the amount of pedal depression has increased from the maximum stroke Spmax(n) or the maximum master cylinder pressure Pmmax(n) stored in the memory device to the stroke Sp or the master cylinder pressure Pm) (Yes in step S10). On the other hand, the braking force corresponding to the previous maximum stroke Spmax(n−1) or the previous maximum master cylinder pressure Pmmax(n−1) is maintained (step S14) when the value of the stroke Sp or the master cylinder pressure Pm is equal to or less than the maximum stroke Spmax(n) or the maximum master cylinder pressure Pmmax(n) stored in the memory (i.e., when the stroke Sp or the master cylinder pressure Pm is reduced by reducing the depression of the brake pedal 1) (No in step S10).

When the value of the stroke Sp or the master cylinder pressure Pm is determined to be equal to or less than the threshold value Spth or the threshold value Pmth (No in step S7), and then the control unit 30 is configured to determine whether the shift range is within the P range (step S15). While the shift range is within the P range (Yes in step S15) and when the value of the stroke Sp or the master cylinder pressure Pm is not 0 (i.e., when the brake pedal is not completely released) (Yes in step S116), the value of the previous maximum stroke Spmax(n−1) or the previous maximum master cylinder pressure Pmmax(n−1) is inputted as the maximum stroke Spmax(n) or the maximum master cylinder pressure Pmmax(n) and the braking force is maintained in step S14. On the other hand, when the value of the stroke Sp or the master cylinder pressure Pm is 0 (i.e., when the brake pedal is completely released) (No in step S16), it is assumed that the driver intends for the braking force to be released. Therefore, the control unit 30 is configured to release the braking force (step S17), and clear the value of the maximum stroke Spmax(n) or the maximum master cylinder pressure Pmmax(n) stored in the memory device (step S18).

When the shift range is not within the P range (No in step S15), it is assumed that the driver does not intend for the vehicle to stop. Therefore, the control unit 30 is configured to generate a braking force corresponding to the stroke Sp or the master cylinder pressure Pm (detected in step S1), and to clear the value of the maximum stroke Spmax(n) or the maximum master cylinder pressure Pmmax(n) stored in the memory device (step S18).

Referring now to FIGS. 3 to 6, the operation of the brake control apparatus in accordance with the illustrated embodiment will be explained. FIGS. 3 to 6 illustrate a relationship among the brake operation value (the stroke Sp or the master cylinder pressure Pm), the operations of the actuator unit 9 and the braking force. In FIGS. 3 to 6, the stroke Sp is used as an example of the brake operation value.

Figure 3:
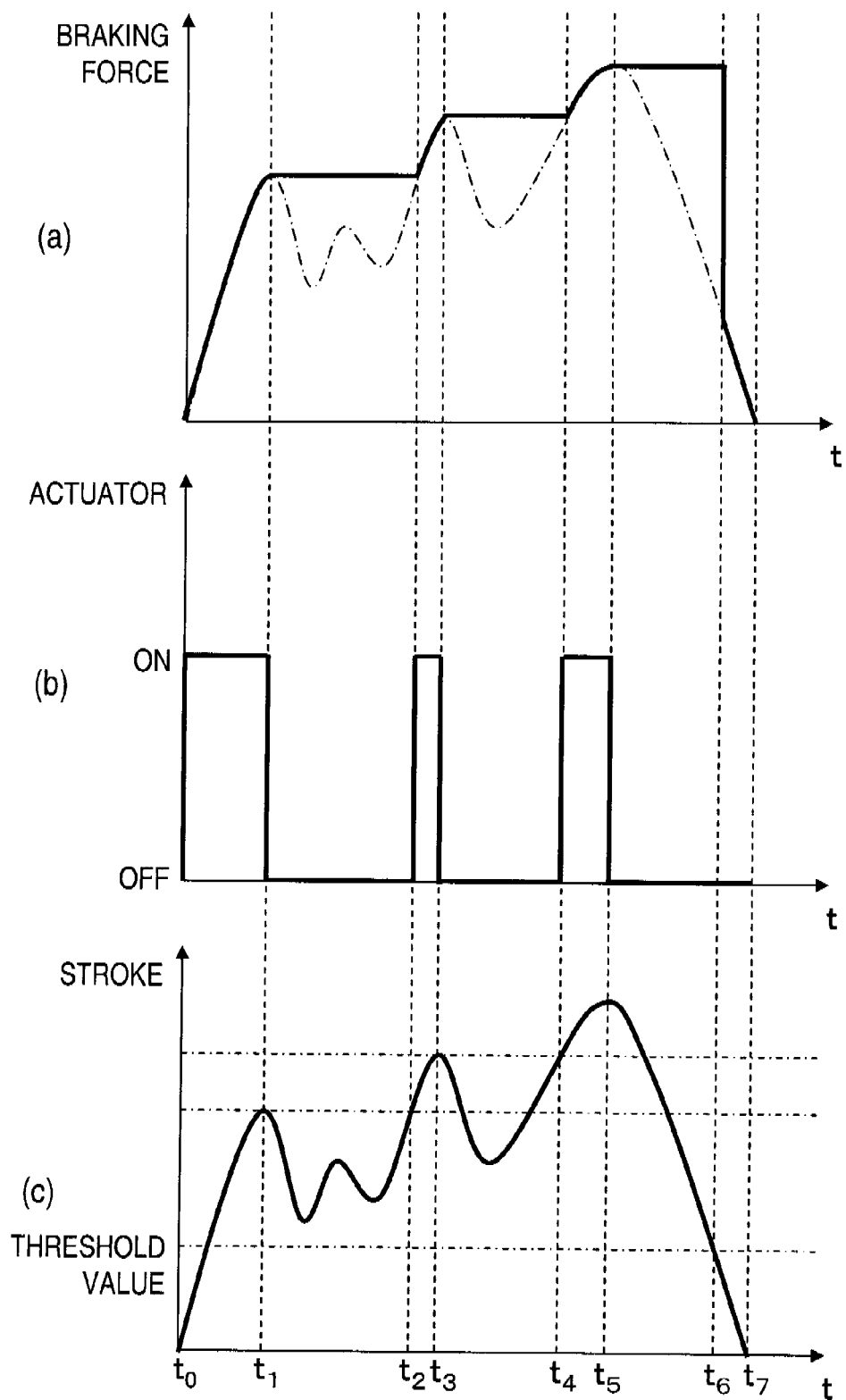
FIG. 3 is a characteristic diagram illustrating changes over time in a brake operation value (a stroke of a brake pedal), an output value of an actuator and a braking force when the brake pedal is pumped while a vehicle remains stationary and when the shift range is not within the parking range in accordance with the illustrated embodiment of the present invention.

FIG. 3 illustrates the stroke Sp and the braking force that vary over time in a case in which the driver pumps the brake pedal 1 while the vehicle remains stationary (while the vehicle is in the stopped state). FIG. 3 illustrates a case in which the shift range is not within the P range. A chart (a) of FIG. 3 shows the change over time in the braking force, a chart (b) of FIG. 3 shows the state of operation of the actuator unit 9 over time, and a chart (c) of FIG. 3 shows the change over time in the stroke of the brake pedal 1.

In accordance with the brake control apparatus of the present invention, the change in the stroke Sp (or the master cylinder pressure Pm) caused by the driver pumping the brake pedal 1 is shown by the solid line in the chart (c) of FIG. 3, wherein the braking force desired by the driver increases from 0 when the pedal is depressed in the period $t_0$ through $t_1$. The control unit 30 is configured to drive the actuator unit 9 as shown in the chart (b) of FIG. 3 in order to increase the braking force, and the braking force is increased as shown in the chart (a) of FIG. 3. When the brake pedal 1 is depressed in the period t2 through t3 to a level at or above the stroke Sp (or master cylinder pressure Pm) that existed at time $t_1$, as shown in the chart (c) of FIG. 3, the control unit 30 is configured to increase the braking force in proportion to the increase in pedal depression (stroke) as shown in the charts (a) and (b) of FIG. 3. The control unit 30 is configured to drive the actuator unit 9 until the braking force increases to a level that corresponds to the stroke Sp (or the master cylinder pressure Pm). The same control is performed in the period $t_3$ through $t_6$. However, when the stroke Sp (or the master cylinder pressure Pm) falls to the threshold value Spth (or the threshold value Pmth) or less at time $t_6$ as shown in the chart (c) of FIG. 3, the control unit 30 is configured to generate the braking force corresponding to the stroke Sp (or the master cylinder pressure Pm) as shown in the chart (a) of FIG. 3 instead of maintaining the value of the braking force even when the value of the stroke Sp (or the master cylinder pressure Pm) is reduced while the actuator unit 9 remains at rest as shown in the charts (a) and (b) of FIG. 3.

Figure 4:
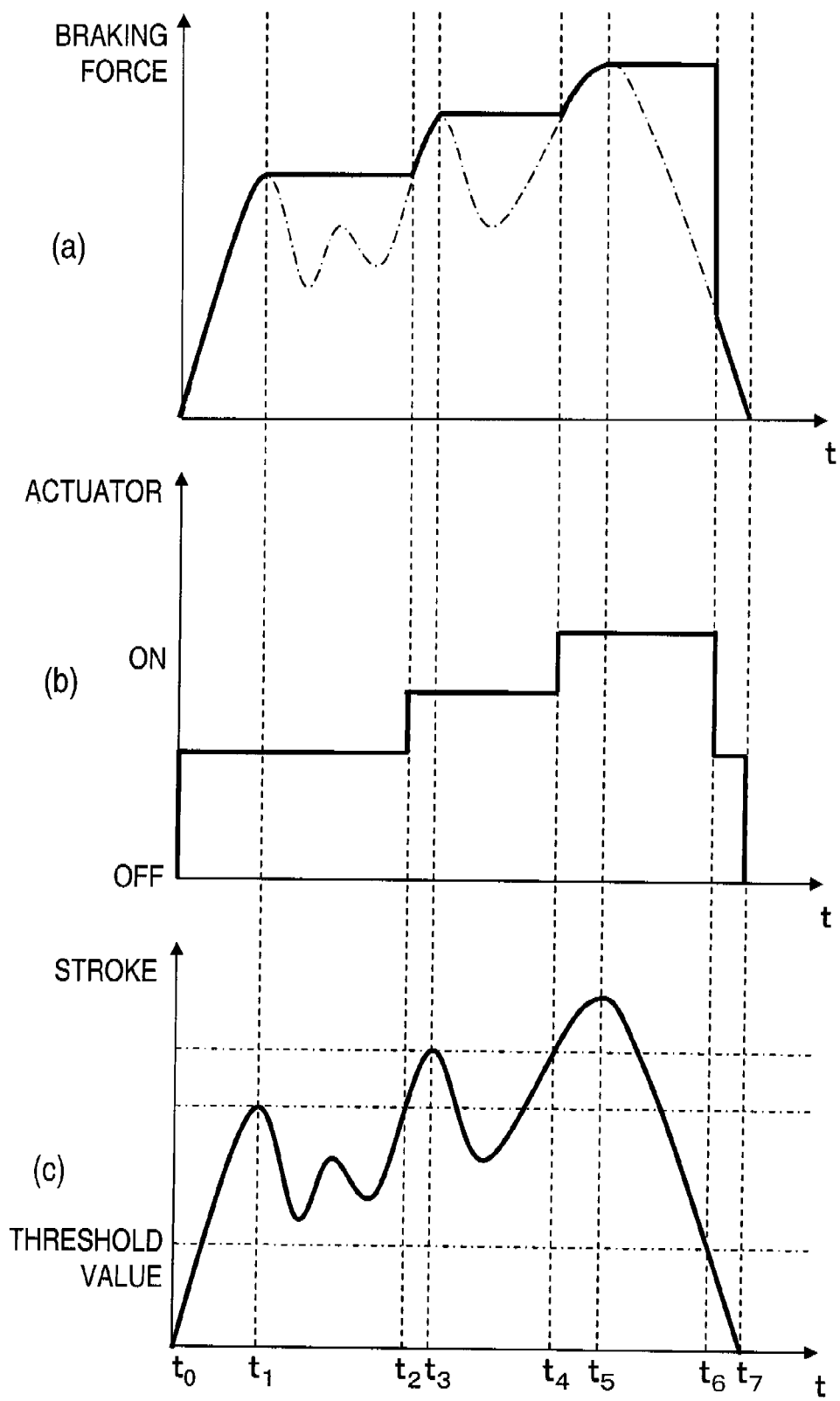
FIG. 4 is a characteristic diagram illustrating changes over time in the brake operation value (the stroke of the brake pedal), the output value of the actuator and the braking force when the braking force is maintained by controlling a plurality of electromagnetic valves when the brake pedal is pumped while the vehicle remains stationary in accordance with the illustrated embodiment of the present invention.

FIG. 4 illustrates, similarly to FIG. 3, the stroke Sp and the braking force that vary over time in a case in which the driver pumps the brake pedal 1 while the vehicle remains stationary (while the vehicle is in the stopped state). A chart (a) of FIG. 4 shows the change over time in the braking force, a chart (b) of FIG. 4 shows the state of operation of the actuator unit 9 over time, and a chart (c) of FIG. 4 shows the change over time in the stroke of the brake pedal 1. In the case illustrated in FIG. 4, the control unit 30 is configured to prevent the braking force from increasing by closing the normally open electromagnetic valves 4a to 4d without stopping the driving of the actuator unit 9. Thus, the actuator unit 9 is kept driven even when the stroke Sp or the master cylinder pressure Pm of the brake pedal 1 is reduced while the vehicle remains stationary as shown in the charts (b) and (c) of FIG. 4. The control unit 30 is configured to open the normally open electromagnetic valves 4a to 4d to increase the braking force when the stroke Sp (or the master cylinder pressure Pm) of the brake pedal 1 is increased by pedal depression.

Figure 5:
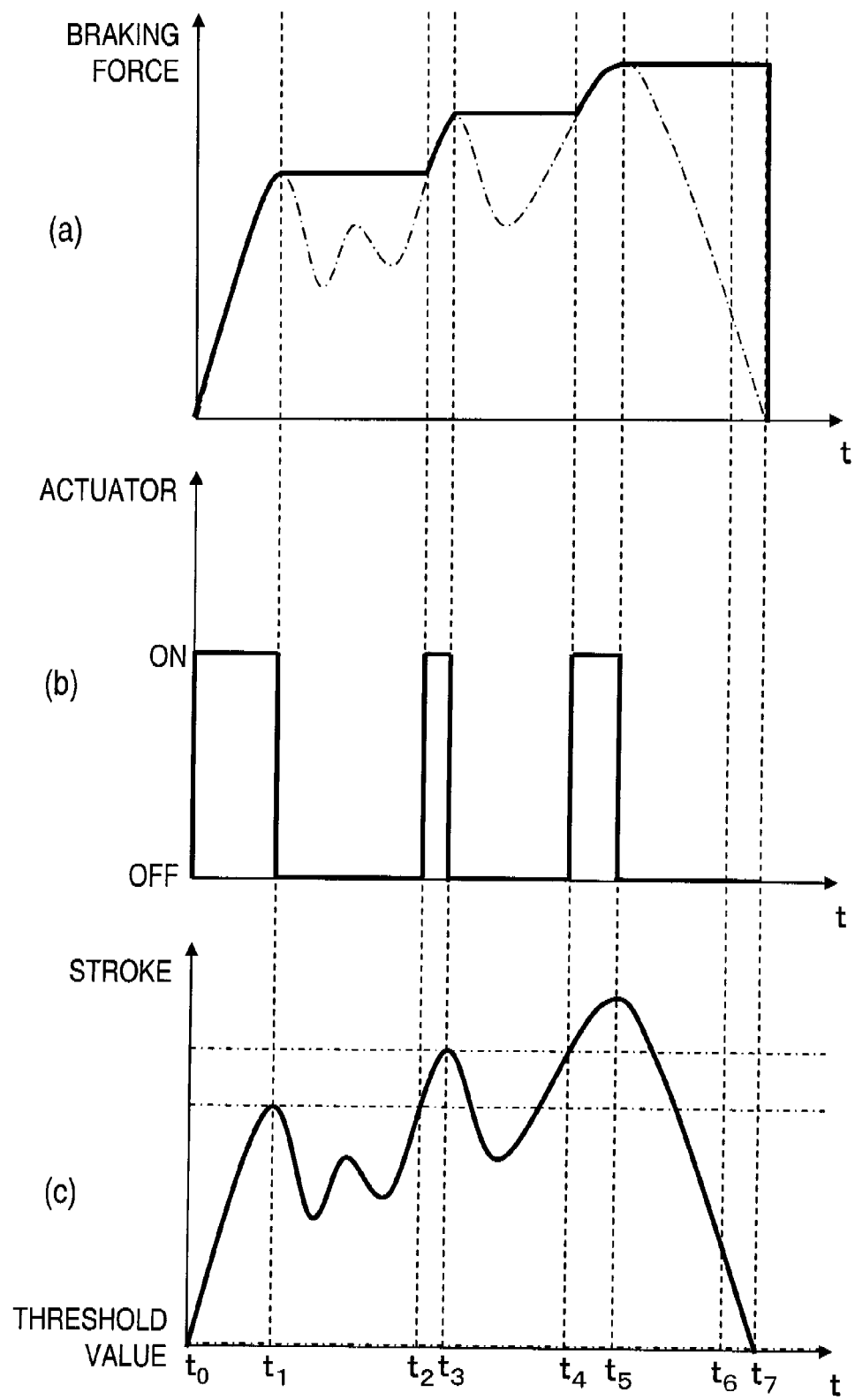
FIG. 5 is a characteristic diagram illustrating changes over time in the brake operation value (the stroke of the brake pedal), the output value of the actuator and the braking force when the brake pedal is pumped when a shift range is within a parking range while the vehicle remains stationary.

FIG. 5 illustrates, similarly to FIG. 3, the stroke Sp and the braking force that vary over time in a case in which the driver pumps the brake pedal 1 while the vehicle remains stationary (while the vehicle is in the stopped state). A chart (a) of FIG. 5 shows the change over time in the braking force, a chart (b) of FIG. 5 shows the state of operation of the actuator unit 9 over time, and a chart (c) of FIG. 5 shows the change over time in the stroke of the brake pedal 1. The difference between the cases illustrated in FIG. 3 and FIG. 5 is that the shift range is within the P range in the case illustrated in FIG. 5. The differences between the cases illustrated in FIG. 5 and FIG. 3 are described below. Also, in the case illustrated in FIG. 5, the threshold value Spth (or the threshold value Pmth) is corrected to a smaller value such as a value substantially equal to 0.

As shown in the charts (a) and (b) of FIG. 5, since the shift range is within the P range in the period $t_6$ through $t_7$, the control unit 30 is configured to maintain the braking force without reducing the braking force in response to the reduction in the stroke of the brake pedal 1 (or the master cylinder pressure Pm) even when the stroke Sp (or the master cylinder pressure Pm) is reduced. The actuator unit 9 remains at rest at this time. The value of the braking force is reduced to 0 when the value of the stroke Sp (or the master cylinder pressure Pm) reaches 0 (i.e., when the brake pedal is completely released) at time $t_7$ as shown in the charts (a) and (c) of FIG. 5.

FIG. 6 illustrates, similarly to FIG. 3, the stroke Sp and the braking force that vary over time in a case in which the driver pumps the brake pedal 1 while the vehicle remains stationary (while the vehicle is in the stopped state). A chart (a) of FIG. 6 shows the change over time in the braking force, a chart (b) of FIG. 6 shows the state of operation of the actuator unit 9 over time, and a chart (c) of FIG. 6 shows the change over time in the stroke of the brake pedal 1. The difference between the cases illustrated in FIG. 3 and FIG. 6 is that, in the case illustrated in FIG. 6, the control unit 30 is configured to gradually decrease the braking force after the stroke Sp (or the master cylinder pressure Pm) falls below the threshold value Spth (or the threshold value Pmth) at time $t_6$. Similarly to the case illustrated in FIG. 3, in the case illustrated in FIG. 6, the shift range is not within the P range. The differences between the cases illustrated in FIG. 6 and FIG. 3 are described below.

The control executed by the control unit 30 is the same as in FIG. 3 in the period $t_0$ through $t_6$ in FIG. 6. However, when the value of the stroke Sp (or the master cylinder pressure Pm) is equal to or less than the threshold value Spth (or the threshold value Pmth) at time $t_6$, as shown in the chart (c) of FIG. 6, the control unit 30 is configured to gradually decreases the braking force as the value of the stroke Sp (or the master cylinder pressure Pm) is reduced as shown in the chart (a) of FIG. 6.

With the brake control apparatus in accordance with the illustrated embodiment of the present invention, the braking force is maintained when the stroke Sp of the brake pedal 1 or the master cylinder pressure Pm (pressure generated in the master cylinder 2) is reduced while the vehicle is stopped, as described above. Therefore, even in cases in which the brake pedal 1 is depressed again after reducing the depression of the brake pedal 1, there is no need to increase the braking force up to the level at which the braking force is maintained. Accordingly, the drive sound of the actuator unit 9 accompanying the increase in the braking force can be suppressed until the braking force is subsequently increased. Furthermore, the energy loss involved in increasing the braking force can be reduced.

When the stroke Sp of the brake pedal 1 or the master cylinder pressure Pm is greater than a value of the stroke Sp or the master cylinder pressure Pm that corresponds to the braking force that is maintained while the vehicle remains stationary, the control unit 30 is configured to increase the braking force according to the increase in the stroke Sp of the brake pedal 1 or the master cylinder pressure Pm. Therefore, a period in which the drive sound of the actuator unit 9 accompanying the increase in the braking force is generated can be shortened.

Moreover, the control unit 30 may be configured to maintain the braking force while maintaining the output of the actuator unit 9 as shown in the chart (b) of FIG. 4. In such case too, the drive sound of the actuator unit 9 can be reduced while the output of the actuator unit 9 is maintained. The control unit 30 is configured to close the normally open electromagnetic valves 4a to 4d are closed to maintain the braking force of the wheel cylinders 6a to 6d while the vehicle is stationary, whereby the drive sound of the actuator unit 9 can be reduced.

The control unit 30 is configured to calculate the stroke Sp or the master cylinder pressure Pm (the threshold values Spth or Pmth) corresponding to the braking force required to keep the vehicle stationary. When the braking force corresponding to the stroke Sp of the brake pedal 1 or the master cylinder pressure Pm falls below the calculated threshold value Spth or Pmth, the control unit 30 is configured to cancel maintaining the braking force. For example, when the stroke Sp of the brake pedal 1 or the master cylinder pressure Pm is reduced to a certain extent (below the threshold value Spth or the threshold value Pmth) while the vehicle remains stationary, it is assumed that the driver no longer intends for the vehicle to be stationary. In such case, it is assumed to be less likely that the driver will depress the brake pedal 1 again to increase the stroke Sp of the brake pedal 1 or the master cylinder pressure Pm (i.e., it is less likely that the actuator unit 9 will be driven). Therefore, by setting the threshold value Spth or the threshold value Pmth, the control unit 30 is configured to apply the brakes according to the intentions of the driver while minimizing the unnecessary driving of the actuator unit 9 accompanied by increase in the stroke Sp of the brake pedal 1 or the master cylinder pressure Pm.

When the stroke Sp of the brake pedal 1 or the master cylinder pressure Pm is equal to or less than the threshold value Spth or the threshold value Pmth, the control unit 30 is configured to reduce the braking force to a value corresponding to the stroke Sp of the brake pedal 1 or the master cylinder pressure Pm whereby the braking force is released in accordance with the intentions of the driver when the vehicle starts moving.

When the vehicle is kept stationary without depressing the brake pedal 1 such as when the shift range is within the P range as previously described, the control unit 30 is configured to prevent the brake fluid pressure from being reduced (i.e., to maintain the braking force) even in cases in which the stroke Sp of the brake pedal 1 or the master cylinder pressure Pm is equal to or less than the threshold value Spth or the threshold value Pmth. The vehicle is kept stationary regardless of the depression of the brake pedal 1 when the shift range is within the P range. Therefore, the brake fluid pressure (braking force) is prevented from being reduced even when the depression of the brake pedal 1 is reduced and the stroke Sp or the master cylinder pressure Pm is allowed to decrease to a level at or below the threshold level (the threshold value Spth or the threshold value Pmth). Thus, the operation required to increase the brake fluid pressure can be eliminated in such case. As a result, the actuator unit 9 can be prevented from being unnecessarily driven according to the increase in the stroke Sp of the brake pedal 1 or the master cylinder pressure Pm. Therefore, unnecessary energy consumption can be further prevented with the present invention.

The present invention is not limited to the arrangements in the illustrated embodiment as described above. For example, in the illustrated embodiment, the actuator unit 9 is used as an example of a braking actuator configured and arranged to generate a braking force. However, the braking actuator used in the present invention is not limited to the actuator unit 9. More specifically, the braking actuator of the present invention may also be an electric caliper type actuator wherein a piston of a caliper for each of the wheel cylinders is pushed by an electric motor. In other words, the present invention is not limited to be adapted to a hydraulic brake system (EHB), and may also be adapted to an electric brake system (EMB). In cases in which the electric calipers are driven to control the braking force, the sounds of the motor driving the electric calipers can be suppressed, energy consumption can be reduced, and the same effects can be obtained as those obtained when the actuator unit 9 is driven to control the brake fluid pressure as in the illustrated embodiment.

In the illustrated embodiment, a case in which the shift range is within the P range (when the vehicle is in the parking state) was described as an example of a condition in which the vehicle is kept stationary without depressing the brake pedal 1. However, the present invention is not limited to this arrangement. An operation of a parking brake, for example, may also be considered to be a condition in which the vehicle is kept stationary without depressing the brake pedal 1.

In the illustrated embodiment, the threshold value Spth or the threshold value Pmth (lower limit) can be corrected to a smaller value (e.g., 0) when the vehicle is kept stationary without depressing the brake pedal 1 (when the vehicle is in the parking state). Moreover, the present invention is not limited to this arrangement, and the threshold value Spth or the threshold value Pmth (lower limit) can be corrected to a smaller value that is less than the threshold value Spth or the threshold value Pmth but greater than 0. In such case, the effect of preventing the brake fluid pressure from being reduced can be obtained even when the stroke Sp or the master cylinder pressure Pm decreases to a level at or below the original threshold value Spth or Pmth (the uncorrected threshold).

In the illustrated embodiment, the control unit 30 is configured to limit driving of the actuator unit 9 such that the actuator unit 9 is not driven when the maximum stroke Spmax or the maximum master cylinder pressure Pmmax has not been updated. However, the present invention is not limited to this arrangement. For example, the control unit 30 can be configured to drive the actuator unit 9 but to limit a driving condition of the actuator unit 9 when the maximum stroke Spmax or the maximum master cylinder pressure Pmmax has not been updated. In such case, the actuator unit 9 is driven, for example, at a level at which the driving of the actuator unit 9 does not cause any discomfort for the driver. The braking force can thereby be varied, for example, when the maximum stroke Spmax or the maximum master cylinder pressure Pmmax has not been updated.

Figure 7:
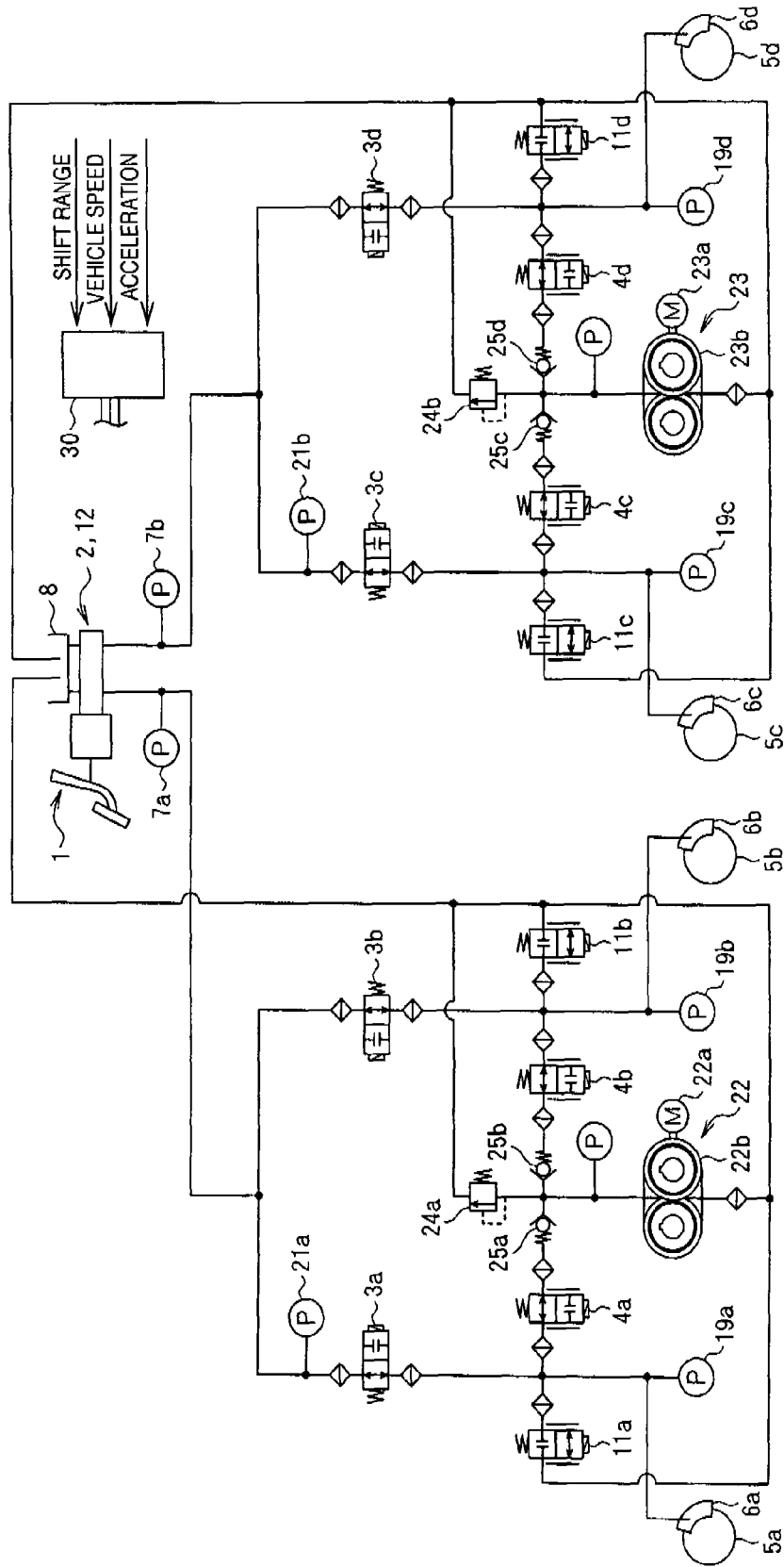
FIG. 7 is an overall schematic diagram of an alternative configuration of the brake control apparatus in accordance with the illustrated embodiment of the present invention.

In the illustrated embodiment, the configuration of the brake control apparatus is illustrated in FIG. 1. However, the brake control apparatus of the present invention is not limited to this configuration. FIG. 7 shows an alternative configuration of the brake control apparatus in accordance with the present invention. In view of the similarity between the configurations of the brake control apparatus illustrated in FIG. 1 and FIG. 7, the parts of the alternative brake control apparatus in FIG. 7 that are identical to the parts of the brake control apparatus in FIG. 1 will be given the same reference numerals as the parts illustrated in FIG. 1. Moreover, the descriptions of the parts illustrated in FIG. 7 that are identical to the parts illustrated in FIG. 1 may be omitted for the sake of brevity.

As shown in FIG. 7, the master cylinder 2 has a pair of sensors 21*a* and 21*b* mounted on the output side of the master cylinder 2. Two pumps 22 and 23 are connected to the reservoir 8 with one on the side having the wheels 5*a* and 5*b* and the other on the side having the wheels 5*c* and 5*d*. The pumps 22 and 23 include, respectively, electric motors 22*a* and 23*a* and hydraulic pumps 22*b* and 23*b* rotatably driven by the electric motors 22*a* and 23*a*. The electric motors 22*a* and 23*a* are controlled by the control unit 30. The reservoir 8 and the pumps 22 and 23 are connected by relief valves 24*a* and 24*b*, respectively. The actuator unit 9 and the normally open electromagnetic valves 4*a* to 4*d* (open during standby) are connected by a plurality of check valves 25*a* to 25*d*, respectively, and are configured and arranged to allow a flow in only one direction from the actuator unit 9 to the normally open electromagnetic valves 4*a* to 4*d*. In FIG. 7, the master cylinder 2 and the stroke simulator 12 are shown as being integrated for the illustration purposes.

In the alternative brake control apparatus configured as shown in FIG. 7, driving the pumps 22 and 23 of the alternative brake control apparatus can produce the same effects as those obtained by driving the actuator unit 9 of the brake control apparatus shown in FIG. 1.

According to the brake control apparatus of the present invention, the braking force is maintained even when the stroke Sp (or the master cylinder pressure Pm) of the brake pedal 1 is reduced while the vehicle remains stationary. Therefore, even in cases in which the brake pedal 1 is depressed again, there is no need to increase the braking force up to the level at which the braking force is maintained. Accordingly, generation of the sound accompanying the increase in the braking force can be suppressed while the braking force is maintained until the braking force is subsequently increased.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A brake control apparatus comprising:
a brake operation detecting section configured to detect a brake operation value indicative of an operation of a brake element;
a vehicle state detecting section configured to detect whether a vehicle is in a stopped state;
a braking force generating section configured to generate a braking force;
a braking force adjusting section configured to adjust the braking force generated in the braking force generating section based on the brake operation value; and
a brake control section configured to control the braking force adjusting section to prohibit reduction in the braking force when the brake operation value decreases while the vehicle is in the stopped state, and configured to cancel prohibiting the reduction in the braking force currently being prohibited in response to the brake operation value being greater than zero and equal to or less than a threshold value corresponding to a minimum brake operation value required to keep the vehicle in the stopped state.

2. The brake control apparatus as recited in claim 1, wherein
the braking force adjusting section includes a fluid pressure adjusting section configured to change a fluid pressure to adjust the braking force generated in the braking force generating section.

3. The brake control apparatus as recited in claim 1, wherein
the brake operation detecting section is further configured to detect an operation amount of the brake element as the brake operation value.

4. The brake control apparatus as recited in claim 3, wherein
the brake control section is further configured to increase the braking force in proportion to an increase in the operation amount of the brake element when the operation amount of the brake element is greater than an operation amount required to maintain a current value of the braking force.

5. The brake control apparatus as recited in claim 1, wherein
the brake operation detecting section is further configured to detect an operation force of the brake element as the brake operation value.

6. The brake control apparatus as recited in claim 5, wherein
the brake control section is further configured to increase the braking force in proportion to an increase in the operation force of the brake element when the operation force of the brake element is greater than an operation force required to maintain a current value of the braking force.

7. The brake control apparatus as recited in claim 2, wherein
the brake control section is further configured to control the fluid pressure adjusting section to maintain a current value of the fluid pressure to maintain a current value of the braking force.

8. The brake control apparatus as recited in claim 2, wherein
the fluid pressure adjusting section includes a braking actuator, and
the brake control section is further configured to maintain a current output value of the braking actuator to maintain a current value the braking force.

9. The brake control apparatus as recited in claim 2, wherein
the braking force generating section includes a plurality of wheel cylinders and a plurality of control valves configured and arranged to selectively block a fluid from flowing into the wheel cylinders, and
the brake control section is further configured to close the control valves to maintain a current value of the braking force.

10. The brake control apparatus as recited in claim 1, wherein
the brake control section is further configured to control the braking force adjusting section to generate the braking force corresponding to the brake operation value when the brake control section cancels prohibiting the reduction in the braking force.

11. The brake control apparatus as recited in claim 1, wherein
the vehicle state detecting section is further configured to detect whether the vehicle is in a parking state, and
the brake control section is further configured to prohibit the reduction in the braking force to maintain a current value of the braking force even when the brake operation value decreases below the threshold value when the vehicle is in the parking state.

12. A brake control method comprising:
detecting a brake operation value indicative of an operation of a brake element;
detecting whether a vehicle is in a stopped state;
generating a braking force based on the brake operation value;
prohibiting reduction in the braking force when the brake operation value decreases while the vehicle is in the stopped state; and
cancelling the prohibiting of the reduction in the braking force currently being prohibited in response to the brake operation value being greater than zero and equal to or less than a threshold value corresponding to a minimum brake operation value required to keep the vehicle in the stopped state.

* * * * *